Oct. 23, 1934.  M. H. JOHANSON  1,977,765
METHOD OF AND MEANS FOR PRODUCING GEARS
Filed Aug. 11, 1931   2 Sheets-Sheet 1

INVENTOR
M. H. Johanson
BY
his ATTORNEY

Patented Oct. 23, 1934

1,977,765

UNITED STATES PATENT OFFICE 1,977,765

METHOD OF AND MEANS FOR PRODUCING GEARS

Magnus H. Johanson, Rochester, N. Y., assignor to Gleason Works, Rochester, N. Y., a corporation of New York Application August 11, 1931, Serial No. 556,418

4 Claims. (Cl. 90—3)

The present invention relates to the production of gears and particularly to the production of straight toothed bevel gears.

The primary object of this invention is to provide an improved method for cutting straight tooth gears and especially straight bevels and the invention may be practiced in either the roughing or finishing of such gears.

A further and auxiliary object of the invention is to permit of the use of face mill gear cutters for roughing or finishing straight tooth gears.

Straight bevel gears are commonly cut today with reciprocating planing tools. Spiral bevel gears have, also, been cut with planing tools, but this method of cutting spiral bevel gears has been supplanted, except for very large size gears, by the face mill cutting process for the reason that with the face mill, the idle return stroke of the reciprocating tool is eliminated, the cutting operation may be further accelerated because the tool is rotating instead of reciprocating, and the burden of cutting is distributed among a plurality of blades. Heretofore, however, the use of face mill cutters has been restricted to the cutting of longitudinally curved tooth gears. The purpose of the present invention is to make it possible to use this type of cutter for the cutting of straight tooth gears, thereby enabling the advantages of this cutter to be realized to a still wider extent.

With the present invention, straight tooth surfaces are cut by feeding a rotating face mill cutter into depth and then moving the cutter in a longitudinally straight line across the face of the gear blank. For the finishing of gears, two cutters are employed. These are adapted, respectively, to finish cut opposite sides of the teeth. The two are first fed into depth and then moved in straight converging lines across the face of the blank. The outermost points of the blades of the cutters remain, of course, in the root surface of the blank during this latter movement. Gears may be roughed with the present invention with a single cutter. In this case, one side of the teeth of the blank will be straight but the other side will have a slight curvature.

Figure 1:
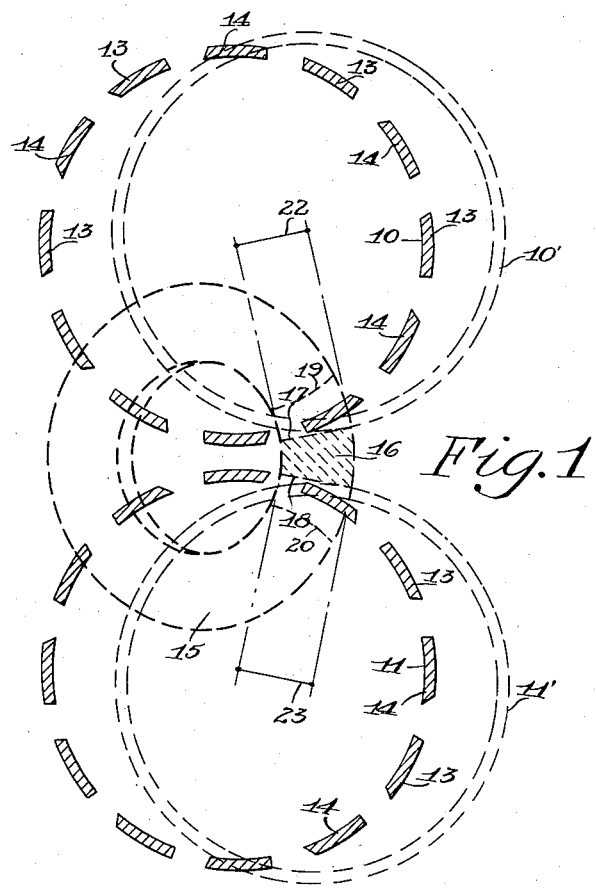
Figure 1 is a plan view illustrating diagrammatically one application of this invention to the finish cutting of bevel gears.

The present invention may be employed in the cutting of spur, helical, bevel and hypoid gears. Referring first to Figure 1, 10 and 11 designate a pair of face mill gear cutters, such as have heretofore been used in the art for the cutting of longitudinally curved tooth gears. These cutters may be of any usual or suitable construction. They may be made, for instance, as disclosed in the patent to James E. Gleason No. 1,236,834 of August 14, 1917. In the drawings, the cutters 10 and 11 are illustrated as provided with blades 13 and 14 arranged alternately and adapted, respectively, to cut on opposite sides of a tooth space of a gear blank. The outside cutting blades are designated at 13 and the inside blades at 14. The cutters 10 and 11 are of opposite hand, the cutter 10 rotating in a counter-clockwise direction and the cutter 11 rotating in a clockwise direction.

15 designates the bevel gear blank to be cut. The cutters 10 and 11 may finish cut simultaneously, as shown, opposite sides 17 and 18 of the same tooth 16 of the blank or opposite side tooth surfaces of spaced teeth of the blank. In cutting the bevel gear blank 15, the cutters 10 and 11 are positioned so that their axes are inclined to the axis of the blank at an angle determined by the root angles of the tooth spaces to be cut in the blank, and while rotating are first fed into depth. In this feed movement, the cutters cut, of course, a longitudinally curved tooth slot in the blank. When the cutters have reached full depth position, they are fed across the face of the blank in converging straight lines to cause them to sweep out the converging longitudinally straight side tooth surfaces 17 and 18 on the blank. In this traverse of the cutters across the face of the blank, their axes, respectively, travel along straight lines 22 and 23 parallel, respectively, to the side tooth surfaces being cut. The positions 10 and 11 shown in full lines are positions of the cutters at one end of their traversing movement, while the positions 10' and 11', shown in dotted lines, are the positions of the cutters at the other end of their traversing movement.

It will be seen that as the cutters move across the face of the blank, their outside cutting edges operate to produce longitudinally straight tooth surfaces 17 and 18 while their inside cutting edges will leave curved tooth surfaces 19 and 20. After the cutters have completed their traverse, they are withdrawn from engagement with the blank and the blank indexed. When the blank has been indexed far enough for the tooth surface 20 to have reached the position occupied by the tooth surface 17, the outside cutting edges of the cutter 10 in their traverse across the face of the blank will finish cut this tooth surface producing a straight finished tooth side. Likewise when the blank has been indexed far enough for the tooth surface 19 to have reached the position occupied by the tooth surface 18, the outside cutting edges of the cutter 11 in their traverse across the face of the blank will finish cut this tooth surface producing a straight finished tooth side. The intermittent cutting and indexing proceeds until all of the tooth surfaces have been finish cut and the blank has been completed.

In the drawings, the cutters are shown as traversed from the small to the large end of the teeth. They might, however, be traversed from the large to the small end of the teeth. In the latter case, the directions of rotation of the two cutters would be reversed.

In the cutting of spur gears, the cutters are traversed in directions parallel to the axis of the blank. For helical gears or for bevel or hypoid gears having skew teeth, the cutters are traversed along lines inclined to the axis of the blank in accordance with the helix angle or inclination of the teeth to be cut.

The present invention may be employed with advantage in the roughing of either spur or bevel gears whether they are to be finished according to the process of the present invention or according to any other method. In this case, it is only necessary to employ one cutter, as with the single cutter, one tooth side will be cut straight and while the other tooth side will be curved, the curvature will be so slight as to leave what amounts to nothing more than a desirable amount of stock to be removed in the finishing operation.

Figure 2:
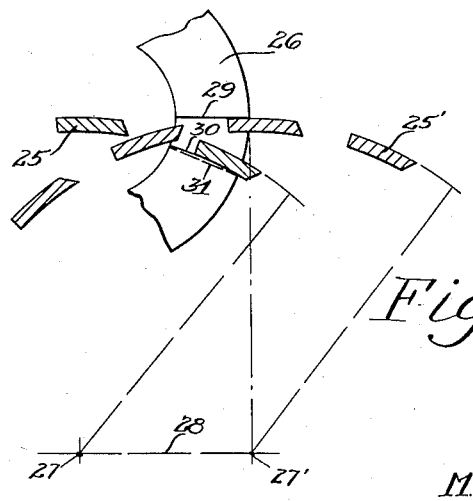
Figure 2 is a fragmentary view illustrating diagrammatically how a single face mill cutter may be used to rough bevel gears according to this invention.

Figure 2 illustrates the roughing operation as applied to bevel gears. 25 designates the cutter and 26 the bevel gear blank to be roughed. The cutter is positioned relative to the gear blank, as before, with its axis inclined to the axis of the blank in accordance with the root angle of the tooth spaces to be cut. The cutter is fed into depth and then traversed across the face of the blank. The position of the cutter at the beginning of the traverse is indicated at 25 and the position of the cutter at the end of the traverse is indicated at 25'. It will be seen that the axis of the cutter is moved from 27 to 27' along a straight line 28 parallel to one side 29 of the tooth space being cut. This side 29 is roughed longitudinally straight. The opposite side 30 of the tooth space is, however, slightly curved, but the amount of stock left on the curved side is no greater than is considered desirable for cleaning up in a finishing operation. The dotted lines 31 indicate the position which this tooth side will have when finished and the amount of material between the lines 30 and 31 is the amount of material left on the roughed blank to be cleaned up in the finishing operation.

Figure 3:
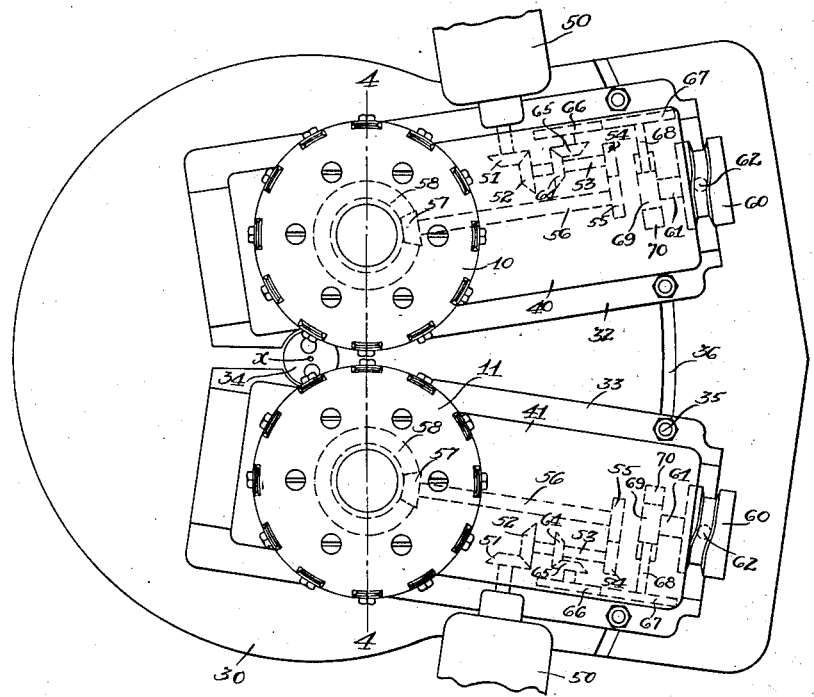
Figure 3 is a front elevation of the tool mechanism of a bevel gear cutting machine constructed according to this invention for finish cutting bevel gears.
Figure 4:
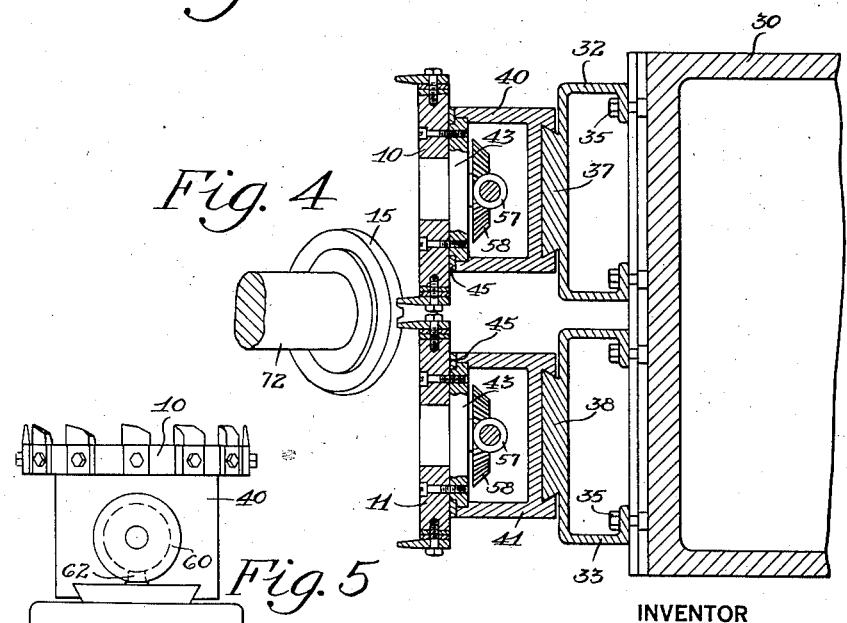
Figure 4 is a section on the line 4—4 of Figure 3 and showing the cutters in engagement with the bevel gear blank.
Figure 5:
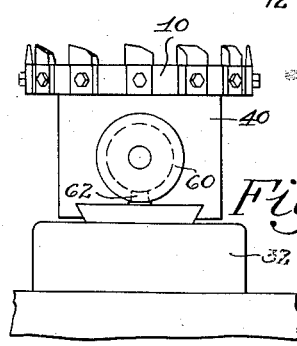
Figure 5 is an end elevation of one cutter and its support.

Figures 3 to 5 inclusive illustrate somewhat diagrammatically the general construction of a machine for cutting bevel or hypoid gears according to this invention. 30 designates a support or column which is formed with a front face of irregular shape having a wing at one side, as clearly shown in Figure 3. On the face of this column 30, there are mounted a pair of arms 32 and 33, which are angularly adjustable about the axis X of a stud 34. The arms 32 and 33 may be secured in any position of their angular adjustment by means of T-bolts 35 which engage in a circular T-slot 36 curved about the axis X as a center.

The arms 32 and 33 are provided, respectively, with longitudinal guide surfaces 37 and 38 of dove-tailed shape in cross-section. Mounted on the arms 32 and 33 are slides 40 and 41, respectively. These slides are provided with ways co-operating with the guide surfaces of the arm and they slide longitudinally on such guide surfaces.

Journaled in each of said slides 40 and 41 is a rotatable head or support 43. These heads or supports are secured in position by circular gibs or rings 45. The cutters 10 and 11 are secured to these supports or heads 43.

The cutters are rotated during the operation of the machine from motors 50 which are journaled, respectively, on the two slides 40 and 41. As the drives to the two cutters are identical, we shall describe only one specifically here. The cutter 10 is driven from its motor 50 through bevel gears 51 and 52, the shaft 53, the change gears 54 and 55, the shaft 56 and the bevel gears 57 and 58. The shafts 53 and 56 of the two cutter drives are journaled in the respective slides 40 and 41. In the machine illustrated, the cutters are traversed across the face of the blank, although it is to be understood that it is within the contemplation of this invention to traverse the blank across the cutters. In the machine illustrated, the traverse movement for each slide 40 and 41, respectively, is obtained from a cam 60. These cams are secured, respectively to shafts 61 that are journaled, respectively, in the slides 40 and 41. The cams 60 engage rollers or followers 62 which are secured to the respective tool arms 32 and 33. The shafts 61 are driven from the shafts 53 through bevel gears 64 and 65, spur gears 66 and 67, the shaft 68, the worm 69 and the worm wheel 70, the latter being secured to the shaft 61. All of the gearing driving each cam 60 is mounted upon the corresponding tool slide 40 or 41. It will be seen that as the cams are rotated, the slides 40 and 41, respectively, will be moved on the arms 32 and 33, respectively, to traverse the cutters 10 and 11, respectively, across the face of the blank.

The blank to be cut is indicated at 15. This is secured in any suitable manner to the work spindle 72 which is journaled in the work head. The work head end of the machine has not been illustrated as this may be of the same construction as commonly employed on bevel gear cutting machines at the present time. The mechanism for feeding the tools into depth may operate either to produce a depthwise feed of the tool or of the blank, and as both types of mechanisms are well known in the art and are in use on bevel gear cutting machines now on the market, it has not been necessary to illustrate either here. Suffice it to say that when the tools have reached full depth position, the traversing motion may begin. The cam 60 may be constructed for this purpose so as to have a dwell during the feed movement and impart motion to the respective slides 40 and 41 only after the tools have reached full depth position. Other constructions will, however, occur readily to those skilled in this art and it is not intended to limit the invention to the particular construction shown.

The present invention has particular advantage in the cutting of non-generated gears, both bevel and hypoid, but it is to be understood that the new steps may be employed in generating process, also.

In general, it may be said that while this invention has been described with reference to a particular embodiment, it will be understood that the invention is capable of further modification and that this application is intended to cover any variations, uses, or adaptations of the invention, following, in general, the principles of the invention and including such departures from the present disclosure as come within known or customary practise in the gear art and as may be applied to the essential features hereinbefore set forth and as fall within the scope of the invention and the limits of the appended claims.

Having thus described my invention, what I claim is:

1. The method of cutting a gear which comprises feeding a rotating face mill gear cutter into depth and producing a relative movement between said cutter and blank so that the cutter moves across the face of the gear blank in a straight line across the whole face of the blank in a direction parallel to a tooth side of the blank and the outermost points of its blades travel on the root surface of the blank.

2. The method of cutting a gear which comprises employing a pair of face mill gear cutters and while rotating said cutters on their respective axes, feeding said cutters into depth and moving said cutters across the whole face of the blank in straight lines parallel, respectively, to opposite side tooth surfaces of the blank to cut, respectively, opposite side tooth surfaces on the blank which are longitudinally straight, the outermost points of the blades of said cutters moving, during said last named movement, on the root surface of the blank.

3. The method of cutting straight teeth on a tapered gear blank which comprises employing a pair of face mill gear cutters, positioning said cutters with their axes inclined to the axis of the gear blank in accordance with the root angle of the gear to be cut, and, while rotating said cutters on their respective axes, feeding said cutters into depth and moving them, respectively, across the whole face of the blank along converging straight lines, parallel, respectively, to opposite side tooth surfaces of the blank, the outermost points of the blades of said cutters moving, during said last named movement, on the root surface of the blank.

4. In a machine for cutting tapered gears, a work support, a tool support, a pair of arms mounted on the tool support for angular adjustment about a common center and provided with longitudinally straight guide surfaces, a pair of slides mounted on said arms and having ways adapted to cooperate with said guide surfaces, a face mill cutter journaled in each of said slides, means for rotating the cutter, and means for simultaneously actuating said slides to move said cutters in straight converging lines across the face of the blank.

MAGNUS H. JOHANSON.